(12) United States Patent
Wigley et al.

(10) Patent No.: US 9,020,348 B2
(45) Date of Patent: Apr. 28, 2015

(54) OPTICAL PATH SWITCHING

(75) Inventors: Peter Wigley, Corning, NY (US); Ian Peter McClean, Brixham (GB)

(73) Assignee: II-VI Incorporated, Saxonburg, PA (US)

( * ) Notice: Subject to any disclaimer, the term of this patent is extended or adjusted under 35 U.S.C. 154(b) by 19 days.

(21) Appl. No.: 14/000,463

(22) PCT Filed: Feb. 21, 2012

(86) PCT No.: PCT/GB2012/050375
§ 371 (c)(1),
(2), (4) Date: Sep. 6, 2013

(87) PCT Pub. No.: WO2012/114089
PCT Pub. Date: Aug. 30, 2012

(65) Prior Publication Data
US 2013/0343757 A1  Dec. 26, 2013

Related U.S. Application Data

(60) Provisional application No. 61/446,865, filed on Feb. 25, 2011.

(30) Foreign Application Priority Data

Aug. 3, 2011  (GB) .................................. 1113389.9

(51) Int. Cl.
*H04J 14/00* (2006.01)
*H04J 14/02* (2006.01)
(Continued)

(52) U.S. Cl.
CPC ... *H04Q 11/0003* (2013.01); *H04Q 2011/0043* (2013.01); *H04J 14/0287* (2013.01); *H04B 10/038* (2013.01); *H04B 10/032* (2013.01)

(58) Field of Classification Search
CPC .... H04B 10/07; H04B 10/032; H04B 10/038; H04J 14/02; H04J 14/0287; H04Q 11/0001; H04Q 2011/0043
USPC ............ 398/1, 2, 5, 7, 45, 48, 82, 91, 92, 157
See application file for complete search history.

(56) References Cited

U.S. PATENT DOCUMENTS

| 5,828,801 A | 10/1998 | Sakamoto | |
| 7,146,100 B2 * | 12/2006 | Osaka | ............................. 398/30 |

(Continued)

FOREIGN PATENT DOCUMENTS

EP  1892859 A1  2/2008

OTHER PUBLICATIONS

Zayer, N. K., et al., "Co-packaged Semiconductor Optical Chips," Provisional U.S. Appl. No. 61/250,677, filed Oct. 12, 2009, 10 Pages.
(Continued)

*Primary Examiner* — Dalzid Singh

(57) ABSTRACT

A light source package is disclosed for a Raman amplifier node having a primary optical fiber for carrying an optical signal and a secondary optical fiber for carrying the optical signal when the signal is rerouted from the primary optical fiber. The light source package includes a primary light source for emitting light into the primary optical fiber when the optical signal is carried by the primary optical fiber to induce Raman gain of the optical signal, and a secondary light source for emitting light into the secondary optical fiber when the optical signal is carried by the secondary optical fiber to induce Raman gain of the optical signal.

8 Claims, 3 Drawing Sheets

(51) Int. Cl.
*H04B 10/00* (2013.01)
*H04Q 11/00* (2006.01)
*H04B 10/032* (2013.01)
*H04B 10/038* (2013.01)

(56) References Cited

U.S. PATENT DOCUMENTS

| | | | |
|---|---|---|---|
| 8,482,849 B2* | 7/2013 | Onaka | 359/334 |
| 2002/0110328 A1 | 8/2002 | Bischel et al. | |
| 2002/0122242 A1 | 9/2002 | Shimojoh | |
| 2002/0154390 A1 | 10/2002 | Shieh et al. | |
| 2003/0039025 A1* | 2/2003 | Mugino et al. | 359/334 |
| 2004/0008404 A1* | 1/2004 | Aoki et al. | 359/334 |
| 2006/0140633 A1 | 6/2006 | Chaput | |
| 2012/0213480 A1* | 8/2012 | Zayer et al. | 385/89 |

OTHER PUBLICATIONS

PCT International Search Report and Written Opinion, Application No. PCT/GB2012/050375 dated May 16, 2012, 10 pages.

GB Search Report, Application No. 1113389.9 dated Nov. 28, 2011, 1 page.

* cited by examiner

OPTICAL PATH SWITCHING

RELATED APPLICATIONS

This application is a 35 U.S.C. 371 national stage filing of International Application No. PCT/GB2012/050375, filed on Feb. 21, 2012, which claims priority to U.S. Provisional Application No. 61/446,864 and United Kingdom Patent Application No. 1113389.9, filed on Aug. 3, 2011. The contents of the aforementioned applications are hereby incorporated by reference.

TECHNICAL FIELD

The present invention relates to optical path switching, and more particularly to switching between optical fibres when distributed Raman amplification is used.

BACKGROUND

In this specification the term "light" will be used in the sense that it is used in optical systems to mean not just visible light, but also electromagnetic radiation having a wavelength outside that of the visible range.

In optical networks, if equipment or a fibre of operating spans is damaged, it is possible to reroute traffic along another path while the damage is repaired. It is also possible to upgrade the equipment in the system without impacting the traffic, again by using alternative optical transmission paths. This has led in some part to optical networks being designed in mesh or ring topologies. In some networks, a secondary optical fibre may be available alongside a primary optical fibre used in normal operating conditions. This secondary optical fibre may be used for operations such as maintenance of the primary optical fibre or restoration if the primary optical fibre is damaged In optical networks, Raman amplifiers can be used to mitigate attenuation of the optical signal along the path. Raman amplifiers are optical amplifiers based on Raman gain, which results from the effect of stimulated Raman scattering. The optical signal is amplified by providing co-propagating and/or or counter-propagating pump light, usually provided by a pump laser or lasers. The wavelength of the pump light is typically around 100 nanometers shorter than the signal wavelength when using standard c-band channels in a Silica optical fibre as the gain medium.

When optical path switching is used one piece of optical equipment could be used for both the primary and secondary optical fibres, as it is more efficient to be able to switch in these optical fibres to the same equipment, rather than using separate pieces of equipment. FIG. 1 is a schematic illustration of such an amplifier node 100 in an optical network. The amplifier node 100 includes an optical fibre 110 coupled to an amplification device 101 such as an erbium-doped fibre amplifier (EDFA), which may be used in conjunction with the Raman amplifier. A switch 105 is coupled to the fibre 110 outside the amplifier node 100 and configured to switch optical paths between a primary optical fibre 102 and a secondary optical fibre 107. The amplifier node 100 includes a Raman pump unit 120 including one or more light sources such as lasers 103, 104. The lasers 103, 104 supply counter-propagating pump light 111 into the optical fibre 110 to induce Raman gain of an optical signal 108 passing along the primary or secondary optical fibre. The counter-propagating light travels in the opposite direction to the optical signal 108.

During the distributed Raman amplification process, very high optical powers are transmitted directly into the optical fibre 110. As the switch 105 is placed outside the optical amplifier node 100 in FIG. 1, this requires the switch 105 to be able to cope with the high optical power from the lasers 103, 104. In addition, the switch 105 introduces loss and therefore reduces the available pump power in the primary or secondary optical fibre. This arrangement also impacts the depolarisation of the lasers 103, 104, increasing the Degree of Polarisation (DOP) of the lasers and reducing the effectiveness of the Raman amplification process. Furthermore, this arrangement adds risks and safety issues to operators working on or near the optical fibres 102, 107 where very high optical powers are used.

An alternative solution to these problems is to locate the switch within the amplifier node 100. However, in such a case, the switch would still need to support high optical powers, again resulting in high loss. This arrangement would also require a depolarisation technique for the lasers which is difficult to achieve and may need polarisation maintaining (PM) switches.

SUMMARY

It would therefore be desirable to reduce the optical loss incurred by the switch between the primary and secondary optical fibres and to maintain the degree of depolarisation (DOP) of the lasers.

According to one aspect of the present invention, there is provided a light source package for a Raman amplifier node having a primary optical fibre for carrying an optical signal and a secondary optical fibre for carrying the optical signal when the signal is rerouted from the primary optical fibre. The light source package comprises at least one primary light source coupled to the primary optical fibre for emitting light into the primary optical fibre when the optical signal is carried by the primary optical fibre to induce Raman gain of the optical signal. The package further comprises at least one secondary light source coupled to the secondary optical fibre for emitting light into the secondary optical fibre when the optical signal is carried by the secondary optical fibre to induce Raman gain of the optical signal, The at least one primary light source may be coupled only to the primary optical fibre and the at least one secondary light source may be coupled only to the secondary optical fibre.

The light source package may be configured so that light can be emitted from either the primary or secondary light source. The light source package may be configured so that the at least one primary light source is not activated at the same time as the at least one secondary light source during normal operation. The light source may be configured so that the at least one secondary light source is activated at the same time as the at least one primary light source for a relatively short period while the output is switched from one light source to the other.

The primary and secondary light sources may be configured as separate chips or stripes, or as a pair of stripes on the same chip.

A Raman amplifier node may comprise the light source package described above. The amplifier node may comprise an optical switch for rerouting the optical signal from the primary optical fibre to the secondary optical fibre or vice versa. The switch may be arranged upstream of an injection point of the light injected by the primary and secondary light sources so that light injected by the primary and secondary sources does not pass through the switch. The amplifier node may further comprise a controller configured to control the operation of the primary and secondary light sources and the switch.

The primary and secondary light sources may comprise lasers.

According to another aspect of the present invention there is provided an optical apparatus comprising a primary optical fibre for carrying an optical signal. The primary optical fibre includes a primary Raman amplifier section. The apparatus further comprises a secondary optical fibre for carrying the optical signal when the signal is rerouted from the primary optical fibre. The secondary optical fibre includes a secondary Raman amplifier section. The apparatus further comprises a pump node comprising at least one primary light source coupled to the primary optical fibre for emitting light into the primary optical fibre when the optical signal is carried by the primary optical fibre to induce Raman gain of the optical signal. The pump node further comprises at least one secondary light source coupled to the secondary optical fibre for emitting light into the secondary optical fibre when the optical signal is carried by the secondary optical fibre to induce Raman gain of the optical signal.

According to another aspect of the present invention there is provided a method of switching optical paths between a primary optical fibre and a secondary optical fibre in a Raman amplifier node, the primary optical fibre carrying an optical signal. The method comprises emitting light into the primary optical fibre from a primary light source coupled to the primary optical fibre to induce Raman gain of the optical signal in the primary optical fibre. The method further comprises rerouting the optical signal into the secondary optical fibre and emitting light into the secondary optical fibre from a secondary light source coupled to the secondary optical fibre to induce Raman gain of the optical signal in the secondary optical fibre.

The primary light source may be deactivated when the secondary light source is activated. The secondary light source may be activated at the same time as the primary light source for a relatively short period while the output is switched from one light source to the other.

The invention also provides a computer program, comprising computer readable code which, when run by a controller of a Raman amplifier node, causes a light source package to behave as described above.

BRIEF DESCRIPTION OF THE DRAWINGS

Some preferred embodiments of the invention will now be described by way of example only and with reference to the accompanying drawings, in which.

DETAILED DESCRIPTION

Figure 2:
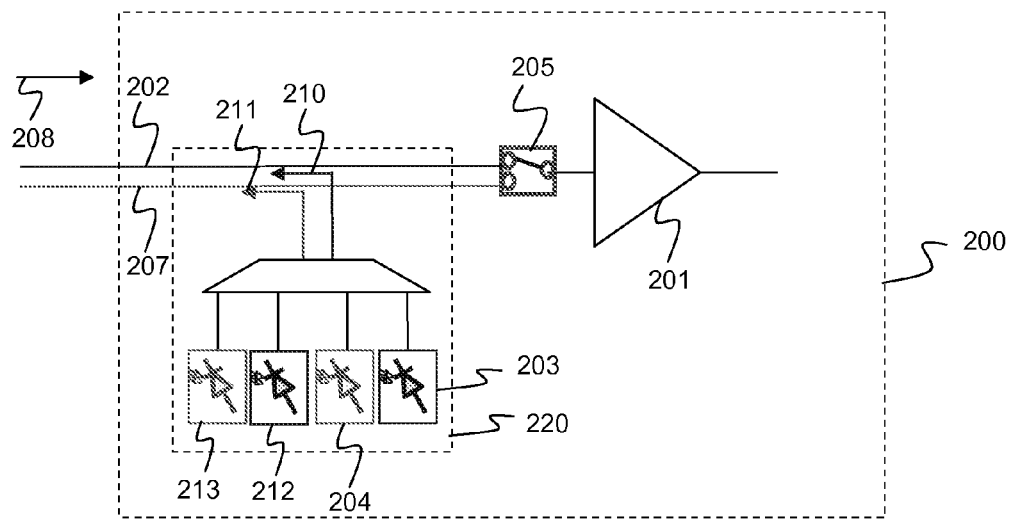
FIG. 2 is a schematic illustration of an amplifier node with a Raman pump unit having two primary lasers and two secondary lasers.

FIG. 2 is a schematic illustration of an amplifier node 200 with a Raman pump unit 220 having two primary lasers 203, 212 and two secondary lasers 204, 213. The node 200 includes a switch 205, optionally coupled to an EDFA or other amplification device 201. The node also includes a primary optical fibre 202 and a secondary optical fibre 207. The switch 205 is configured to switch optical paths between the primary optical fibre 202 and the secondary optical fibre 207. An optical signal 208 normally passes along the primary optical fibre 202. However, when a maintenance or restoration process is required for the primary optical fibre 202, the switch 205 allows the optical signal 208 that was coming from the primary optical fibre 202 into the amplifier 202 to now pass the optical signal 208 on the secondary optical fibre 207 to pass into the amplifier 201. The lasers 203, 204, 212, 213 are capable of supplying counter-propagating light 210, 211 into the optical fibres 202, 207. The primary lasers 203, 212 are arranged to inject light 210 into the primary optical fibre 202, and the secondary lasers 204, 213 are arranged to inject light into the secondary optical fibre 207. During normal operating conditions (i.e. when the optical signal 208 is transmitted along the primary fibre 202), the primary lasers 203, 212 are activated to inject light into the primary optical fibre 202. When any maintenance or restoration process is required and the signal 208 is transmitted along the secondary fibre 207, the primary lasers 203, 212 are deactivated, and the secondary lasers 204, 213 are activated to inject light into the secondary fibre 207. The operation of the lasers may be controlled by a controller (not shown in FIG. 2). The switch 205 is arranged downstream of the lasers (in the direction of travel of the optical signal 208) so that the high power light injected into the optical fibres 202, 207 by the lasers 203, 204, 213, 214 does not pass through the switch 205. This can also be considered to be upstream in the sense of the injected pump light 210, 211.

Figure 1:
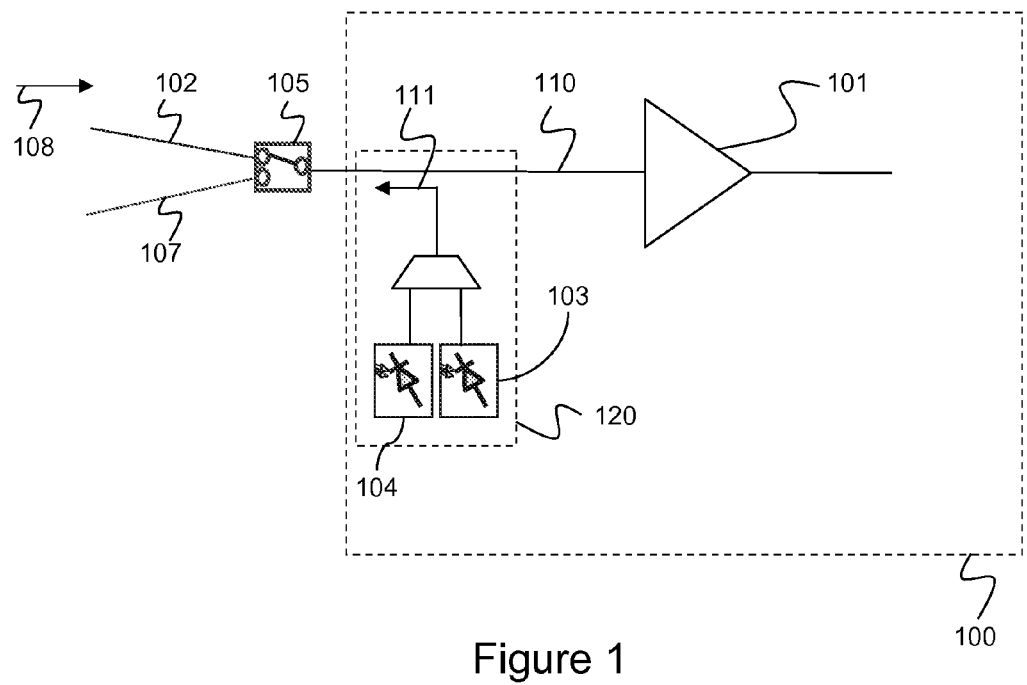
FIG. 1 is a schematic illustration of an amplifier node.

Since separate lasers are provided for the primary and secondary optical fibres 202, 207, there is no need to have a switch outside the amplifier system 200 as in the case of FIG. 1. The arrangement of FIG. 2 is advantageous because it does not have the high optical power loss and the degradation to DOP which are present in the arrangement of FIG. 1. However since four lasers 203, 204, 212, 213 are used, this arrangement may require extra physical space and added cost.

It will be noted that the arrangement of FIG. 2 uses four lasers 203, 204, 212, 213 which supply counter-propagating light 210, 211. However, it will be appreciated that it is also possible to use any number of lasers supplying co- or counter-propagating light into the fibres 202, 207 (co-pump light is light which travels in the same direction as the optical signal 208 passing along the fibres 202, 207).

Figure 3:
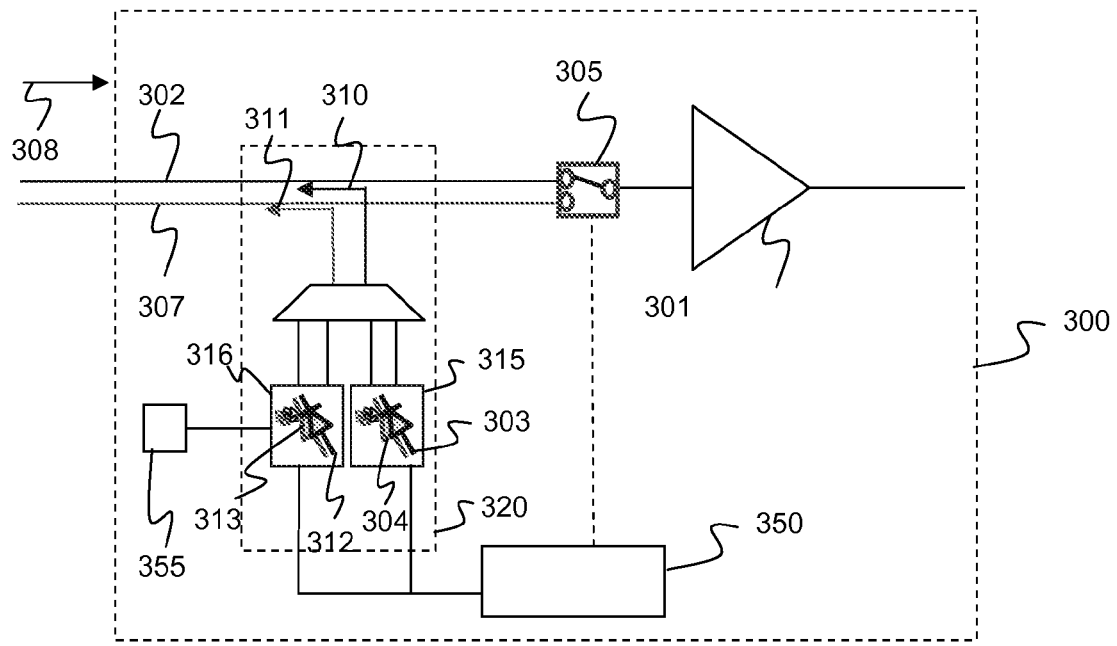
FIG. 3 is a schematic illustration of an alternative amplifier node.

FIG. 3 is a schematic illustration of an alternative amplifier node 300 incorporating a Raman pump unit 320. Many features of the arrangement of FIG. 3 have similar features to those of the arrangement of FIG. 2, i.e. an amplification device 301, a primary optical fibre 302 and a secondary optical fibre 307, and a switch 305 between the optical fibres 302, 307. However, the lasers are configured differently in this arrangement. The amplifier node 300 includes two laser packages 315 and 316. Each laser package 315, 316 includes a primary laser 303, 312 and a secondary laser 304, 313 integrated into the laser package 315, 316. Essentially, there are two laser "stripes" integrated in the laser package. The design of the laser including laser chip, coupling optics, heat management and package could be of many varieties that best support the specific application. An example embodiment is incorporation of two independent 14XX laser stripes on a single thermo electric coupler (TEC) coupled submount with two independent fibres exiting a single industry standard 14-pin butterfly package.

In FIG. 3, the lasers 303, 304, 312, 313 are configured to inject counter-propagating light 310, 311 into the optical fibres 302, 307. The primary lasers 303, 312 of both laser packages 315, 316 are configured to inject light 310 into the primary fibre 302. The secondary lasers 304, 313 of both laser packages 315, 316 are configured to inject light 311 into the secondary fibre 307.

The amplifier node 300 of FIG. 3 also includes a controller 350 operatively connected to the laser packages 315, 316 and the switch 305. The controller 350 controls the operation of the lasers and the switch 305. The controller 350 ensures that only one of the lasers of each laser package 315, 316 is activated at any one time in normal operation and controls how the lasers are switched. For example, when the primary optical fibre is in use, the primary lasers 303, 312 of both laser packages 315, 316 are activated by the controller 350. When a maintenance or restoration process is required to the primary fibre 302, the controller 300 operates the switch 305 to select the optical path through the secondary optical fibre 307. The controller 350 also activates the secondary lasers 304, 313 of both laser packages 315, 316 and turns off the primary lasers 303, 312.

The laser packages 315, 316 of FIG. 3 may also include a TEC 355 to control the temperature of the laser chips. It will be appreciated that there could be any number of laser packages in the Raman pump unit 320 in which each package may have at least one primary laser chip and at least one secondary laser chip. It will be also appreciated that there could be any number of optical fibres in the amplifier node 300 and the lasers would be able to inject light into any of those optical fibres as necessary.

The arrangement of FIG. 3 is advantageous because the package size is much smaller than the individual lasers used in the arrangement of FIG. 2. A laser package having two laser chips can be termed as a "dual chip pump". The use of this dual chip pump is different from a conventional dual chip pump since only one laser chip needs to be activated at any time during normal use. As a result, the TEC 355 in the laser package needs to control the temperature only one laser chip at any one time, rather than controlling the temperature of both laser chips in the laser package at the same time. In addition, the switching time can be significantly faster than when using the optical switch outside the amplifier node (as with the case of FIG. 1).

Figure 4:
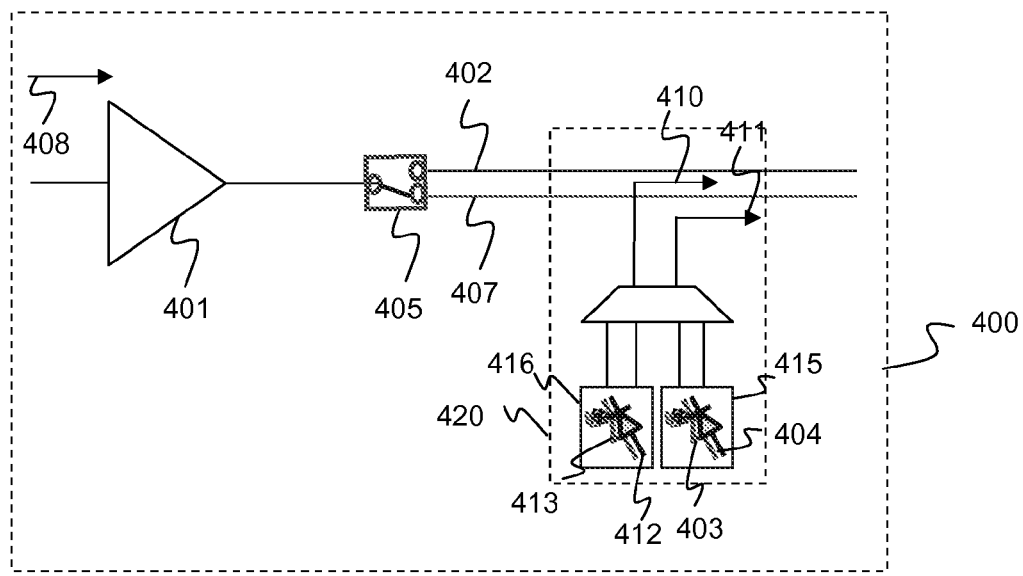
FIG. 4 is a schematic illustration of an alternative amplifier node.

FIG. 4 is a schematic illustration of an alternative amplifier node 400. Many features of the arrangement of FIG. 4 have features similar to those of the arrangement of FIG. 3, i.e. a Raman pump unit 420, an amplification device 401, a primary fibre 402 and a secondary fibre 407, a switch 405 between the primary fibre 402 and the secondary optical fibre 407, laser packages 415, 416 and two laser chips 403, 404; 412, 413 in each laser package 415, 416. However, the lasers 403, 404; 413, 416 of each laser package 415, 416 are configured to inject co-propagating light 410, 411 into the fibres 402, 407, which travel in the same direction as an optical signal 408 passing along the fibres 402, 407. This arrangement provides the same advantages as those discussed with reference to the arrangement of FIG. 3.

Figure 5:
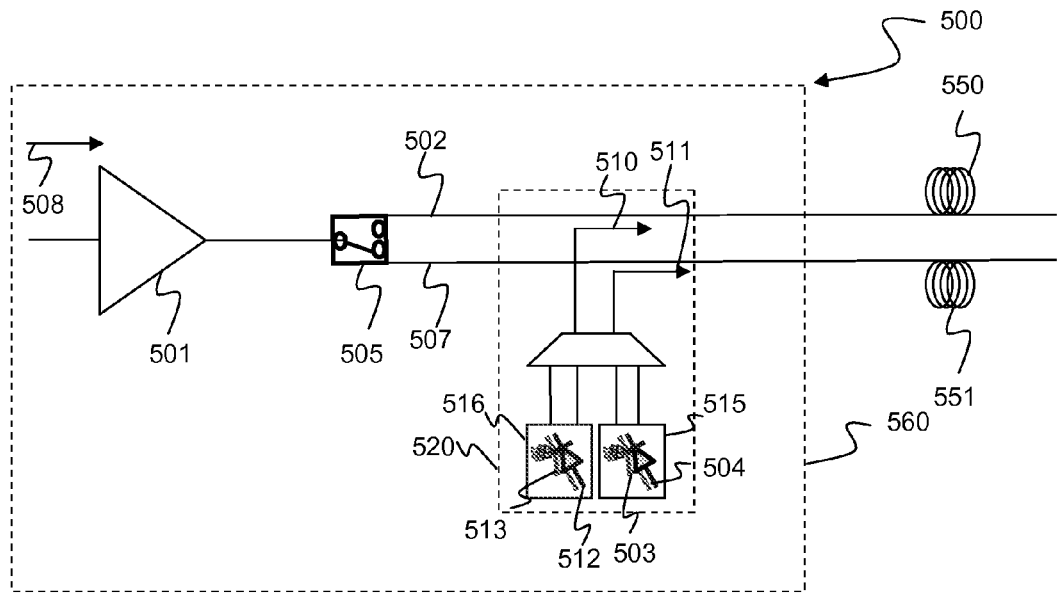
FIG. 5 is a schematic illustration of an optical apparatus.

FIG. 5 is a schematic illustration of an optical apparatus 500, which illustrates how the pump unit of FIG. 4 interfaces with Raman amplifiers in practice. The optical apparatus includes a primary optical fibre 502 including a primary Raman amplifier section 550, and a second optical fibre 507 including a second Raman amplifier section 551. The apparatus 500 also includes a Raman amplifier node 560. All the features of the amplifier node 560 of FIG. 5 are the same as the amplifier node 400 of FIG. 4, i.e. a Raman pump unit 520, an amplification device 501, a switch 505 between the primary optical fibre 502 and the secondary optical fibre 507, laser packages 515, 516 and two co-propagating laser chips 503, 504; 512, 513 in each laser package 515, 516. This arrangement provides the same advantages as those discussed with reference to the arrangement of FIG. 3 or 4.

Figure 6:
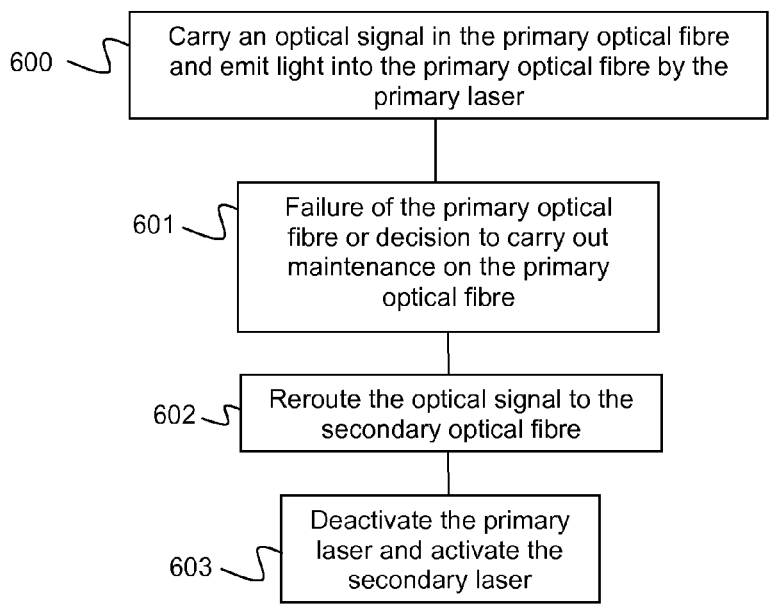
FIG. 6 is a flow diagram illustrating the steps involved in emitting light into the primary and secondary optical fibres.

FIG. 6 is a flow diagram illustrating an example of the steps involved in switching optical paths between the primary and secondary optical fibres in the arrangement of FIG. 3 or 4.

600: The primary optical fibre carries an optical signal and the primary laser emits light into the primary optical fibre.

601: A failure occurs in the primary fibre or a decision is taken to carry out maintenance of the primary fibre.

602: The switch reroutes the optical signal from the primary optical fibre to the secondary optical fibre.

603: The controller deactivates the primary laser and activates the secondary laser to emit light into the secondary fibre.

It is noted that it could also be possible to turn on the secondary laser prior to turning off the primary laser during the process for a brief period of time. This will maintain Raman gain along the fibres for longer although the thermal management may need careful attention.

It will be noted that the foregoing description is directed to arrangements having a switch downstream of the lasers (in the direction of travel of the optical signal). However, it will be appreciated that the Raman amplifier node may not have a switch. It is possible that a switch may be located in the optical network (not in the amplifier node) for rerouting the optical signal between optical fibres. In such a case, the amplifier node simply comprises the primary and secondary optical fibres, and the primary or secondary laser of the Raman pump unit is activated as required to inject light into the primary or secondary optical fibre.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A Raman amplifier node comprising
   a primary optical fibre for carrying an optical signal;
   a secondary optical fibre for carrying the optical signal when the optical signal is rerouted from the primary optical fibre;
   a pump light source package comprising
      at least one primary light source for injecting pump light into the primary optical fibre when the optical signal is carried by the primary optical fibre, the pump light for inducing Raman gain of the carried optical signal; and
      at least one secondary light source for injecting pump light into the secondary optical fibre when the optical signal is carried by the secondary optical fibre, the pump light for inducing Raman gain of the carried optical signal; and
   an optical switch for selecting between the primary optical fibre and the secondary optical fibre, the optical switch arranged upstream of an input point of the pump light injected by the primary and second light sources so that light injected by the primary and secondary sources does not pass through the optical switch.

2. The Raman amplifier node of claim 1, further comprising an additional amplification device, with the optical switch configured for rerouting the optical signal at the input or output of the additional amplification device in the amplifier node initially coming from the primary optical fibre to the secondary optical fibre or vice versa.

3. The Raman amplification node of claim 1 further comprising additional primary and secondary light sources.

4. The Raman amplification node of claim 1, further comprising a controller configured to control the optical of the primary and secondary light sources and the optical switch.

5. An optical apparatus comprising:
   a primary optical fibre for carrying an optical signal, the primary optical fibre including a primary Raman amplifier section;
   a secondary optical fibre for carrying the optical signal when the optical signal is rerouted from the primary optical fibre, the secondary optical fibre including a secondary Raman amplifier section;
   a pump node comprising:
      at least one primary light source coupled to the primary optical fibre for emitting pump light into the primary optical fibre when the optical signal is carried by the primary optical fibre to induce Raman gain of the optical signal; and
      at least one secondary light source coupled to the secondary optical fibre for emitting pump light into the secondary optical fibre when the optical signal is carried by the secondary optical fibre to induce Raman gain of the optical signal; and
   an optical switch for selecting between the primary optical fibre and the secondary optical fibre, the optical switch arranged upstream of an input point of the pump node so that pump light from the primary and secondary sources does not pass through the optical switch.

6. A method of switch optical paths between a primary optical fibre and a secondary optical fibre in a Raman amplifier node, the primary optical fibre carrying an optical signal, the method comprising:
   emitting pump light into the primary optical fibre from a primary pump light source coupled to the primary optical fibre to induce Raman gain of the optical signal in the primary optical fibre;
   emitting pump light into the secondary optical fibre from a secondary light source coupled to the secondary optical fibre to induce Raman gain of the optical signal in the secondary optical fibre;
   rerouting the optical signal into the secondary optical fibre by switching the optical signal between the primary optical fibre and the secondary optical fibre at a location upstream of a location where the pump light is coupled into the primary optical fibre so that pump light from the primary and secondary sources does not pass through the optical switch.

7. The method according to claim 6, wherein the primary light source is deactivated when the secondary light source is activated.

8. The method of claim 6, wherein the secondary light source is activated at the same time as the primary light source for a relatively short period while the output is switched from one light source to the other.

* * * * *